April 19, 1949.   J. T. RUIST   2,467,994
PILLOW BLOCK
Filed Feb. 5, 1946
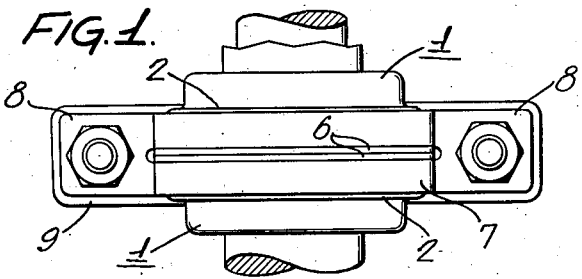
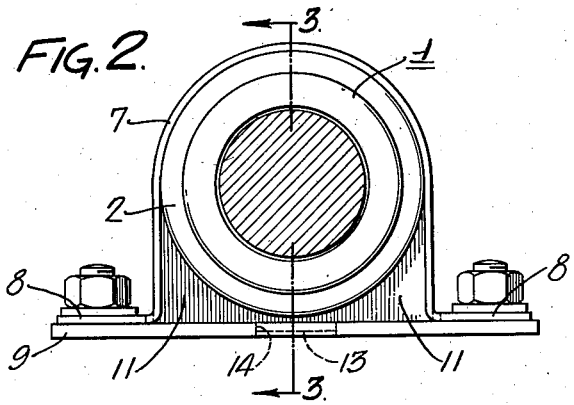
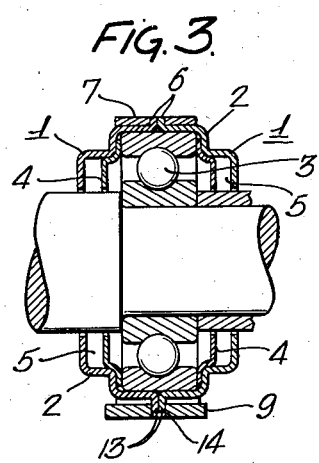
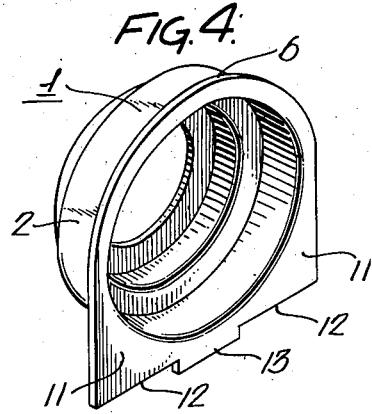
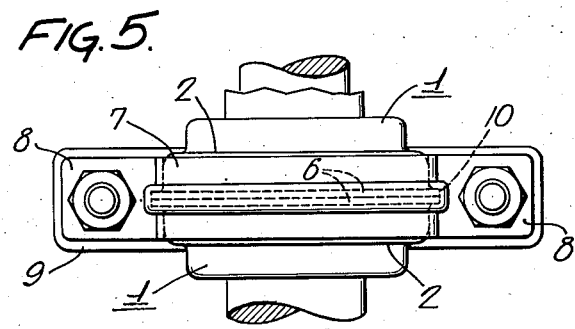
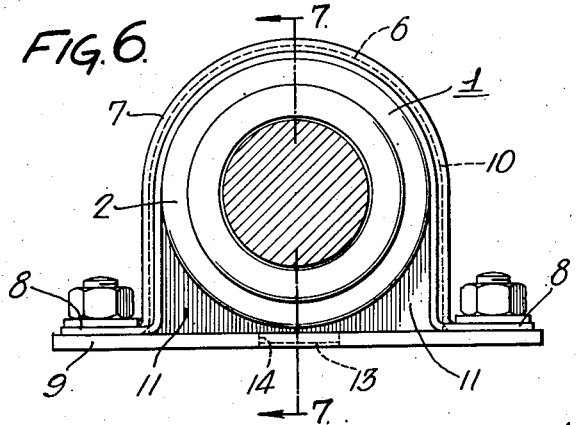
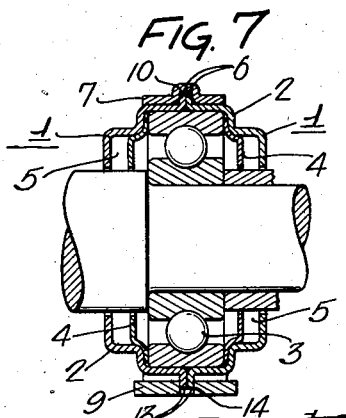
Inventor:
John Ture Ruist
by his Attorneys
Howson & Howson Patented Apr. 19, 1949

2,467,994

UNITED STATES PATENT OFFICE 2,467,994

PILLOW BLOCK

John Ture Ruist, Goteborg, Sweden, assignor to Aktiebolaget Svenska Kullagerfabriken, Goteborg, Sweden, a corporation of Sweden Application February 5, 1946, Serial No. 645,516
In Sweden February 14, 1945

4 Claims. (Cl. 308—189)

The present invention relates to a pillow block, especially for comparatively small sizes of ball or roller bearings and has for its purpose to provide a pillow block for these bearings which can be cheaply manufactured, but which will still be sufficiently strong and rigid to satisfactorily support the loads to which it may be subjected. When pillow blocks are made of comparatively thin sheet material for the purpose of facilitating their manufacture and for the sake of cheapness, they will often be deformed when they are being mounted and this deformation is often communicated to the outer race ring of the bearings.

The present invention relates to a pillow block comprising two housing members of sheet metal engaging each other in a plane perpendicular to the direction of the shaft, in which the above mentioned difficulties are avoided by providing the lower part of the said members with substantially radially directed flanges, the lower edges of which form a support for the pillow block extending across the greater part of the width of the block.

Embodiments of the invention are shown in the accompanying drawings, in which:

Fig. 1 is a top plan view of one of the embodiments;

Fig. 2 is a side elevational view of the embodiment shown in Fig. 1;

Fig. 3 is a sectional view on the line 3—3, Fig. 2;

Fig. 4 is a view in perspective of one of the housing members constituting an element of both embodiments;

Fig. 5 is a top plan view of the other said embodiment;

Fig. 6 is a side elevational view of the embodiment shown in Fig. 5; and

Fig. 7 is a sectional view on the line 7—7, Fig. 6.

The pillow block according to the embodiment of Figures 1 to 4 inclusive comprises two substantially similar housing members 1 each having a cylindrical portion 2, with an internal diameter corresponding to the outer diameter of a ball bearing 3. The central portion of each member is extended axially and forms, together with an inner dished ring 4, an annular groove 5 for a sealing member, for instance a felt ring or the like. The engaging edges of the halves are flanged outwardly to form flanges 6.

The housing members are surrounded on three sides by a U-shaped member 7. The member 7 is provided with feet 8 having holes for screws or bolts for fixing the housing members to a support, for instance together with a base plate 9. In this embodiment the member 7 is provided with a slit, into which the flanges 6 enter, whereby the member 7 also serves to maintain the members 1 in engagement with each other. In the embodiment illustrated in Figures 4 to 7 inclusive the member 7 is provided with a groove 10 into which the flanges 6 enter. In this case the member 7 also serves to retain the housing members in engagement with each other but will itself be somewhat stronger and more rigid than in the embodiment of Figures 1 to 4.

In order that the pillow block may be manufactured sufficiently cheaply to be sold for use with small bearings it must be made of relatively thin sheet material and there is therefore considerable risk that the housing members and the outer race ring of the bearing will be forced out of round when the housing is fastened to the support by means of the member 7. In order to decrease the risk of such deformation the flanges 6 at the lower part of the members 1 are extended to form supporting corners 11. The housing will thereby be supported across it whole width, as the edges 12 of these flanges bear on the support, which may suitably be a base plate 9. Under the centre of the bearing the flanges 6 are further extended to form tongues 13, which enter into a corresponding slit 14 in the base plate 9 and thereby serve to maintain the halves of the housing in engagement with each other at that part of the circumference, where they can not be retained in engagement by means of the member 7.

Having thus described my invention, I claim and desire to secure by Letters Patent the following:

1. A pillow block for antifriction bearings comprising a pair of sheet metal housing members engaging each other in a plane substantially perpendicular to the direction of the shaft, substantially plane flanges on the said housing members, a U-shaped member circumferentially embracing the housing members, the said U-shaped member having means engaging the upper part of the said flanges for maintaining them in engagement with each other, the lower edges of the said flanges being substantially straight to form supports for the housing extending across the greater part of its width.

2. A pillow block for antifriction bearings comprising a pair of sheet metal housing members engaging each other in a plane substantially perpendicular to the direction of the shaft, substantially plane flanges on the said housing members, a U-shaped member circumferentially embracing the housing members, the said U-shaped member having a groove for embracing the upper part of the said flanges and maintaining them in engagement with each other, the lower edges of the said flanges being substantially straight to form supports for the housing extending across the greater part of its width.

3. A pillow block for antifriction bearings comprising a pair of sheet metal housing members engaging each other in a plane substantially perpendicular to the direction of the shaft, substantially plane flanges on the said housing members, a U-shaped member circumferentially embracing the housing members, the said U-shaped member having a groove for embracing the upper part of the said flanges and maintaining them in engagement with each other, a base plate, the lower edges of the said flanges being substantially straight to bear on said base plate across the greater part of the width of the housing.

4. A pillow block according to claim 3 in which the base plate is provided with a slit and the flanges are provided with downwardly extending tongues engaging with the said slit.

JOHN TURE RUIST.

REFERENCES CITED

The following references are of record in the file of this patent:

UNITED STATES PATENTS

| Number | Name | Date |
|---|---|---|
| 1,464,393 | Page | Aug. 7, 1923 |
| 1,729,499 | Anthoni | Sept. 24, 1929 |
| 2,030,193 | Arnold | Feb. 11, 1936 |
| 2,083,688 | Clements | June 15, 1937 |
| 2,287,182 | Leake | June 23, 1942 |